(12) United States Patent
Gokturk et al.

(10) Patent No.: US 7,310,431 B2
(45) Date of Patent: Dec. 18, 2007

(54) OPTICAL METHODS FOR REMOTELY MEASURING OBJECTS

(75) Inventors: Salih Burak Gokturk, Mountain View, CA (US); Carlo Tomasi, Palo Alto, CA (US); Fahri Sürücü, San Jose, CA (US)

(73) Assignee: Canesta, Inc., Sunnyvale, CA (US)

( * ) Notice: Subject to any disclaimer, the term of this patent is extended or adjusted under 35 U.S.C. 154(b) by 606 days.

(21) Appl. No.: 10/412,169

(22) Filed: Apr. 10, 2003

(65) Prior Publication Data

US 2004/0008259 A1 Jan. 15, 2004

Related U.S. Application Data

(60) Provisional application No. 60/371,752, filed on Apr. 10, 2002, provisional application No. 60/429,750, filed on Nov. 27, 2002, provisional application No. 60/420,217, filed on Oct. 21, 2002, provisional application No. 60/426,760, filed on Nov. 15, 2002, provisional application No. 60/433,144, filed on Dec. 13, 2002.

(51) Int. Cl.
*G06K 9/00* (2006.01)

(52) U.S. Cl. ............ 382/103; 382/203; 356/4.01
(58) Field of Classification Search ............ 382/103, 382/106, 108, 154, 168, 193, 194, 199, 201, 382/203, 232, 254, 260, 274, 289, 291, 305, 382/318; 340/942; 356/602, 606, 4.01; 702/159

See application file for complete search history.

(56) References Cited

U.S. PATENT DOCUMENTS

| | | | |
|---|---|---|---|
| 3,610,754 A | | 10/1971 | Pirlet |
| 4,294,544 A | | 10/1981 | Altschuler |
| 5,351,126 A | * | 9/1994 | Takada et al. ............ 356/602 |
| 5,442,573 A | | 8/1995 | Bredberg |
| 5,733,031 A | | 3/1998 | Lin |
| 6,441,888 B1 | * | 8/2002 | Azuma et al. ............ 356/4.01 |
| 6,512,993 B2 | * | 1/2003 | Kacyra et al. ............ 702/159 |
| 6,750,787 B2 | * | 6/2004 | Hutchinson ............ 340/942 |
| 6,795,200 B1 | * | 9/2004 | Barman et al. ............ 356/606 |
| 6,915,008 B2 | * | 7/2005 | Barman et al. ............ 382/154 |
| 6,941,016 B1 | * | 9/2005 | Wagman et al. ............ 382/199 |

FOREIGN PATENT DOCUMENTS

| | | |
|---|---|---|
| EP | 0 370 770 A | 5/1990 |
| GB | 1073 503 A | 6/1967 |
| WO | WO 02/21502 A1 | 3/2002 |

* cited by examiner

*Primary Examiner*—Seyed Azarian

(57) ABSTRACT

A class of measurement devices can be made available using a family of projection patterns and image processing and computer vision algorithms. The proposed system involves a camera system, one or more structured light source, or a special pattern that is already drawn on the object under measurement. The camera system uses computer vision and image processing techniques to measure the real length of the projected pattern. The method can be extended to measure the volumes of boxes, or angles on planar surfaces.

27 Claims, 21 Drawing Sheets

CIRCULAR OBJECT 810

BOX 820

OPTICAL METHODS FOR REMOTELY MEASURING OBJECTS

RELATED APPLICATION AND PRIORITY INFORMATION

This application claims benefit of priority to:

Provisional U.S. Patent Application No. 60/371,752, entitled "Vision Based Virtual Ruler," naming Salih Burak Gokturk as inventor, filed on Apr. 10, 2002;

Provisional U.S. Patent Application No. 60/429,750, entitled "Algorithms and Design Alternatives for Virtual Ruler," naming Salih Burak Gokturk as inventor, filed on Nov. 27, 2002;

Provisional U.S. Patent Application No. 60/420,217, "Method and Apparatus for measuring boxes," naming Carlo Tomasi as inventor, filed on Oct. 21, 2002;

Provisional U.S. Patent Application No. 60/426,760, "More Methods and Apparatus for measuring everyday common objects," naming Fahri Surucu as inventor, filed on Nov. 15, 2002;

Provisional U.S. Patent Application No. 60/433,144, "Ser. No. 60/433,144, "Algorithms and Methodologies for Box Volume Measurement Device," naming Salih Burak Gokturk as inventor, filed on Dec. 13, 2002.

All of the aforementioned priority applications are hereby incorporated by reference in their entirety for all purposes.

FIELD OF THE INVENTION

The present invention relates to a device for making remote measurements of objects. In particular, the present invention relates to remotely measuring the dimension(s) of objects using optical setup, image and/or geometrical processing methods.

BACKGROUND OF THE INVENTION

Literature contains various methods for dimensioning objects. Mechanical rulers are available in many stores, and they require contact to the surface that they measure. Optical methods are available for measuring various properties of the scene.

There are many patents that use optical triangulation to measure the distance of objects from a video sensor. For example, in U.S. Pat. No. 5,255,064, multiple images from a video camera are used to apply triangulation to determine the distance of a moving target.

In U.S. Pat. No. 6,359,680, a three-dimensional object measurement process and device are disclosed by means of optical image capture, projection of patterns and triangulation calculations. The method is used for diagnosis, therapy and documentation in the field of invasive medicine.

In U.S. Pat. No. 6,211,506, a method and apparatus for optically determining the dimension of part surfaces, such as gear teeth and turbine blades. The method uses optical triangulation based coordinate measurement for this purpose.

In U.S. Pat. No. 5,351,126, an optical measurement system for determination of a profile or thickness of an object is described. This system includes multiple light beams generating multiple outputs on the sensor. The outputs are processed in sequence to measure by triangulation the perpendicular distance of the first and second points from the reference plane and to analyze a surface or thickness of the object based upon thus measured perpendicular distances.

Although methods exist for measurement of objects, there does not exist a cost-effective solution for remotely measuring the length of an edge, or the volume of a box in a single snapshot.

SUMMARY OF THE INVENTION

Embodiments of the invention include a camera system, one or more structured light source, or a special pattern that is already drawn on the object under measurement. In one embodiment, the system projects the light source(s) on the surface that the user wants to measure the length of. The camera system uses image-processing techniques to measure the real length of the projected pattern. The method can be extended to measure the volumes of boxes by projecting multiple light sources. Similarly; the method can be generalized by allowing a moving light generator to measure the angles on planar surfaces, or to measure various geometric attributes (such as area, perimeter, center etc . . . ) on a circle, sphere, a rectangular box, a cylinder, etc. Once the volume of an object is found, this method also allows estimating the weight of the object given the weight attributes of the object by multiplying the volume by the unit weight density of the object. Embodiments such as described may be used as a substitute of a length measurer (ruler) or angle measurer (protractor) or a device that measures the volume or area of subjects with known shape. For this reason, some embodiments of the invention may be termed as a class of rulers, in that devices in which an embodiment is implemented uses image processing to measure the dimensions of physical objects.

BRIEF DESCRIPTION OF THE DRAWINGS

Embodiments of the invention are illustrated by way of example, and not by way of limitation, in the figures of the accompanying drawings. Like reference numerals are intended to refer to similar elements among different figures.

DETAILED DESCRIPTION OF THE INVENTION

Figure 1:
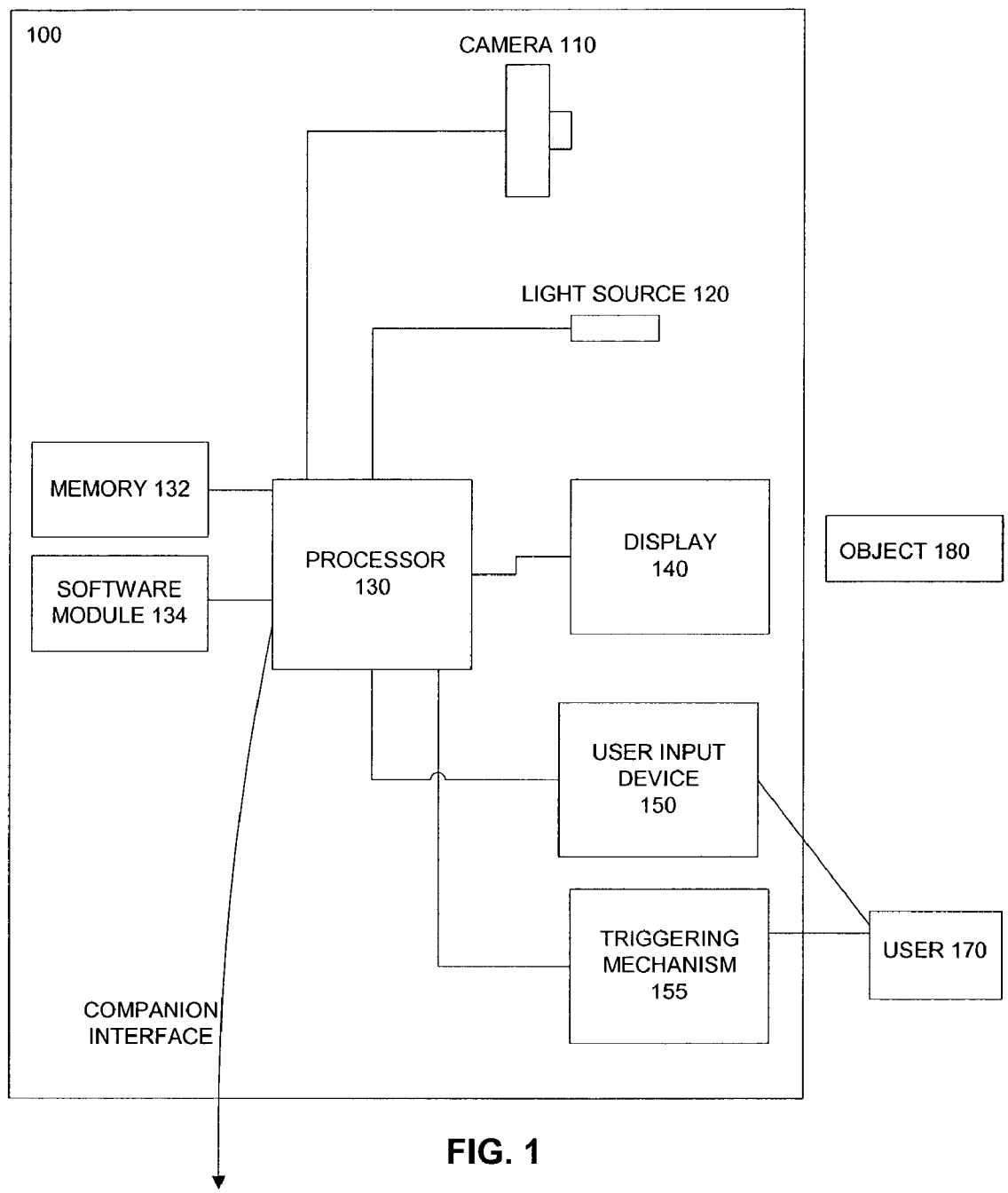
FIG. 1 illustrates a system for remotely measuring objects, under an embodiment of the invention.

Embodiments of the invention describe a method and apparatus for measuring objects remotely. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

A. Overview

According to embodiments of the invention, objects may be measured by optical measurement devices. Such devices project light sources on an object and estimate the real world lengths on the object from the images of the object. The lengths can be measured using a combination of apparatus, methods and algorithms such as described herein.

In an embodiment, one type of an optical measurement device, called "an optical ruler" is described. Optical ruler is the primitive optical measurement device that is used to measure the distance between two points. The present invention first describes the methodologies, and algorithms for an optical ruler.

In another embodiment, the methodology used in an optical ruler is extended for measuring the volumes of boxes by projecting a light pattern on to the box. One embodiment also provides the minimal conditions on this pattern for volume or area measurement. Finally, various apparatuses and design examples are described for which one or more embodiments of an optical ruler, or optical volume measurement device may be implemented.

Another embodiment provides the use of light patterns to determine the center of an object. Still further, another embodiment describes the light pattern to be used in an angle measurement device.

B. Terminology

The term "image" means an instance of light recorded on a tangible medium. The image does not have to be a recreation of the reflection, but merely record a characteristic of a scene, such as depth of surfaces in the scene, or the intensity of light reflected back from the scene. The tangible medium may refer to, for example, an array of pixels.

As used herein, a "module" includes logic, a program, a subroutine, a portion of a program, a software component or a hardware component capable of performing a stated task, function, operation, or process. A module can exist as hardware, software, firmware, or combinations thereof. Furthermore, one module may be distributed over several components or physical devices, so long as there are resources that cooperate with one another to perform the stated functions of the module.

The term "depth" means a depth-wise distance. The depth refers to a distance between a sensor (or other reference point) and an object that is being viewed by the sensor. The depth can also be a relative term such as the vertical distance from a fixed point or plane in the scene closest to the camera.

A "computer-readable medium" includes any medium wherein stored or carried instructions can be retrieved or otherwise read by a processor that can execute the instructions.

The term "optical ruler" means a type of ruler that uses optical setup described in an embodiment of the invention for measuring lengths.

The term "optical volume measurement device" means a device that contains an optical setup described in an embodiment of the invention for measuring volumes.

The term "optical measurement device" means a device that contains an optical setup described in an embodiment of the invention for measuring geometrical attributes of objects.

The term "remotely measuring" means measuring from a distance, and without any contact.

The term "scene" means an area of view for a sensor or image capturing device.

A "box" refers to any polygonal definition of a volume, such as provided by an enclosed surface. A particular type of box is a rectangle parallelepiped volume.

C. System Description

FIG. 1 describes the setup for an optical measurement device. An optical measurement device 100 is composed of a first optical system consisting of camera 110, a second optical system 120 projecting a light source of known pattern, a processing unit 130 with at least one software program, an optional display device 140, an optional user input device 150, a trigger mechanism to activate the system (155), an optional communication interface 160, and packaging.

In one embodiment, these components can be housed in a mobile device. The user 170 points the device toward an object 180 and pulls a trigger mechanism 155 to activate the projector. The light source 120 illuminates the object with a known pattern. In synchrony, the camera 110 obtains a picture of the scene with field of view encompassing at least the object and the projected pattern. The image of the reflected pattern is transferred to the processor 130 and stored in the memory 132. The software module 134 performs image processing on this picture to identify the key points of the reflected light pattern. It then calculates the real world three-dimensional coordinates of these points. Having the coordinates of these points, the geometric attributes of the object are calculated.

The light source 120 projects light of known wavelength. The projected light contains a pattern that must be visible to the user, who has to position the projected pattern anywhere on the front face of the box or object to be measured. This pattern can be formed by shaping a laser, LED, or other light source in one of several ways: First, the pattern could be projected with a miniature slide. Second, a single beam of light may be shaped into lines by diffractive methods, or by a properly designed lens. The Powell lens manufactured by Stocker-Yale, Montreal, Quebec, Canada projects a particularly clean line. Various patterns can be obtained by combining separate projectors, or by combination of cross-hair projectors, or by a single beam-shaping device, or by any combination of these methods.

The camera 110 can be any CCD, CMOS, or other camera. The location and orientation of the camera may be known with respect to the light source. In front of the lens, which could also be replaced with a pinhole, a filter should block as much as possible of the ambient light, but let through most of the power at the wavelength of the projected light. This makes sure that the image formed on the camera sensor is essentially the image of the light pattern, and the processor is undistracted by other features of the environment. This rejection of ambient light can be improved in many ways. For instance, the light source can be pulsed, and the shutter of the camera, electronic or otherwise, can be opened and closed in synchrony with the pulses. More generally, the light source can be modulated in one of many ways, and the camera's sensitivity can be modulated correspondingly.

The camera 110 sends its images to the processing unit 130. This can be a microprocessor on the device itself, or be separate, and connected to the camera through a cable or a wireless connection. If the processing unit is separate, it could be a dedicated device, or a standard computer, such as a personal computer. For each image, captured at any desired frame rate, the processing unit performs the calculations, and outputs the measurement.

Dimensions, volume and any other desired piece of measurement information are either displayed on a display 140 either on the device itself, or on a separate display, such as the screen of a computer. Alternatively, the results could be merely stored in memory, or perhaps transmitted to a separate system, for instance a unit in charge of inventory in a warehouse. An optional companion interface 160 is used to interface optical measurement device 100 to a companion computer or other separate system. The user input device 150 is used to modify the operation of the optical measurement device 100. The user uses the triggering mechanism 155 to activate the system. 150 and 155 could be a key, a button, a touch type screen, or a computer input device.

For a handheld device, all components should be small. If the measurement device is fixed, perhaps near a conveyer belt that transports the boxes to be measured, size is not an issue.

Figure 2:
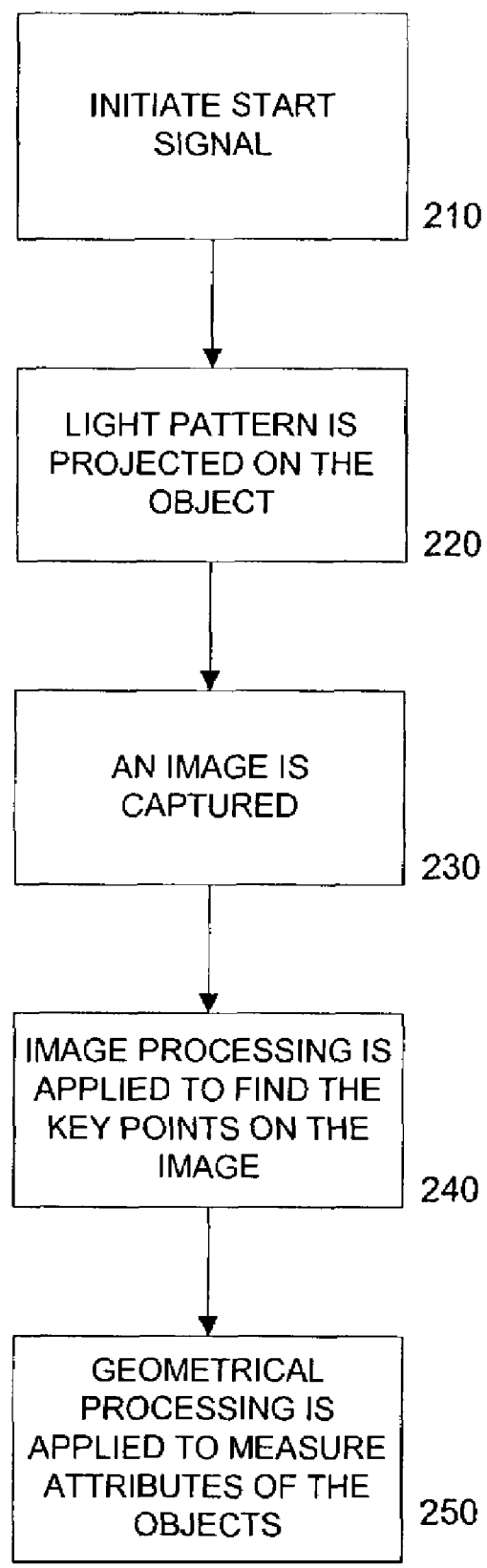
FIG. 2 illustrates a method for remotely measuring objects, under an embodiment of the invention.

FIG. 2 illustrates a methodology for measuring an object under the current invention. Embodiments such as described elsewhere in this application may perform a method such as described in FIG. 2. References to elements of FIG. 1 are provided for illustrative purposes only.

In step 210, a user manually initiates a start signal. Alternatively the start signal is generated automatically, for instance in a warehouse where objects are continuously flowing on a conveyor belt.

In step 220, a light pattern is projected onto the object.

In step 230, an image is captured using camera 110. The captured image contains the projected pattern 120 as it reflects back from the surface of the object 180.

In step 240, image-processing algorithms determine the projected pattern and the key points in the image. Key points depend on the type of projected pattern and the measured object's shape, and may be end points, intersection points, or other defined points of particular interest to the application.

In step 250, geometrical processing is applied to measure attributes of the object. This step may involve mapping point's locations in an image plane to real three-dimensional coordinates, and then calculating the intended measurements such as length, volume, area or angle.

D. Description of the Optical Ruler

Figure 3:
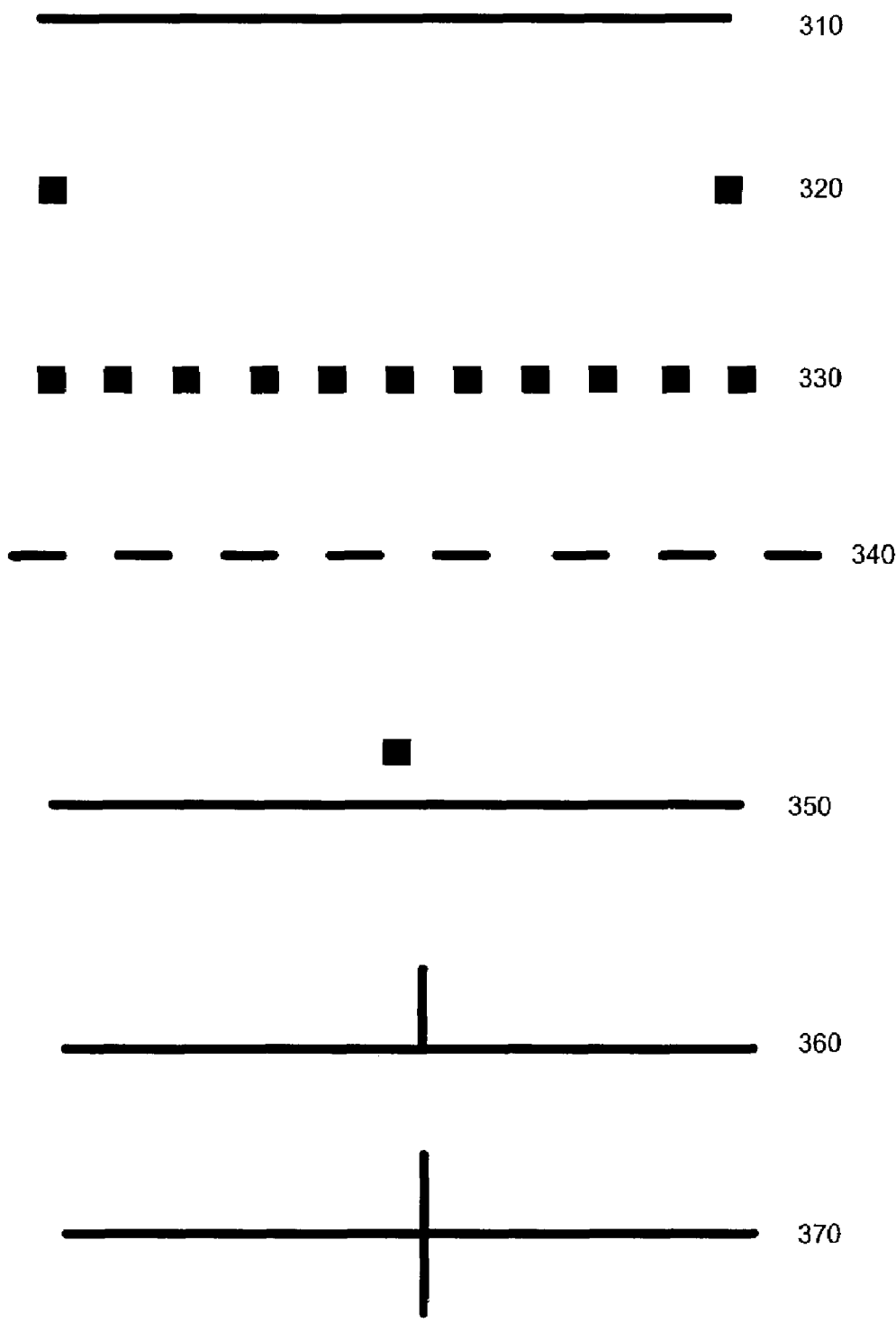
FIG. 3 illustrates examples of projection patterns for use with various embodiments of an optical ruler.

The optical ruler is used for the same purpose of a mechanical ruler to measure length of objects. The user projects at least two points on the real world, that should correspond to the points that the user wants to measure between. The light source(s) can project any light pattern 120 that can produce at least two points on the real world. Examples of light patterns are given in FIG. 3. Without loss of generality, the light pattern can be a line as in 310, two separate points as in 320, a dashed line with tic marks as in 330 or 340, a point and a line as in 350, or two intersecting lines as in 360 and 370. The patterns 350, 360 or 370 can also be used in finding the centers of objects as described in the following sections.

The two end points should correspond to the points in the real world that we want to measure the distance of. The end point can have a broader definition. For instance, the end points can be marked by a break in the line. The end points can be the points where the line terminates. The end points can be marked on the object. The end points can be marked on the light source itself (like a tic mark). The end points can be where there are abrupt changes in the angle of the line. In general, the end points can be any marker that is understood by the user 170 and the image-processing algorithm 240 to identify the measurement points.

Figure 4A:
FIGS. 4A-4C illustrates examples of images taken when a line is used as the projection pattern.
Figure 4B:
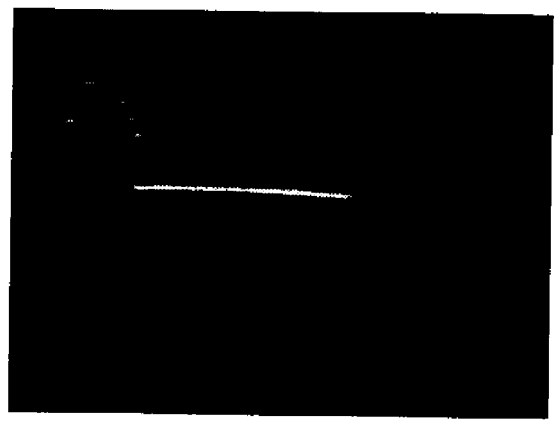
Figure 4C:
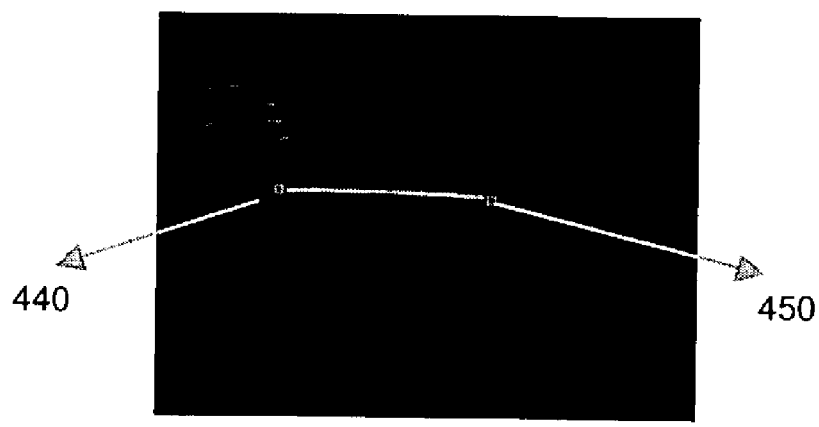

The light source need not be aligned with the object when the object has an edge. FIGS. 4A-4C illustrate examples of images taken when a line (such as line 310 in FIG. 3) is used as the projection pattern. FIG. 4A shows an image that is taken by a camera sensor when a fan-shaped light source is projected on a box. In this example, and without any limitation, the goal can be to measure the length of the box. FIG. 4B illustrates an enhanced image under an embodiment of the invention. FIG. 4C illustrates the end points 440, 450 of the projected lines in the image.

Figure 5:
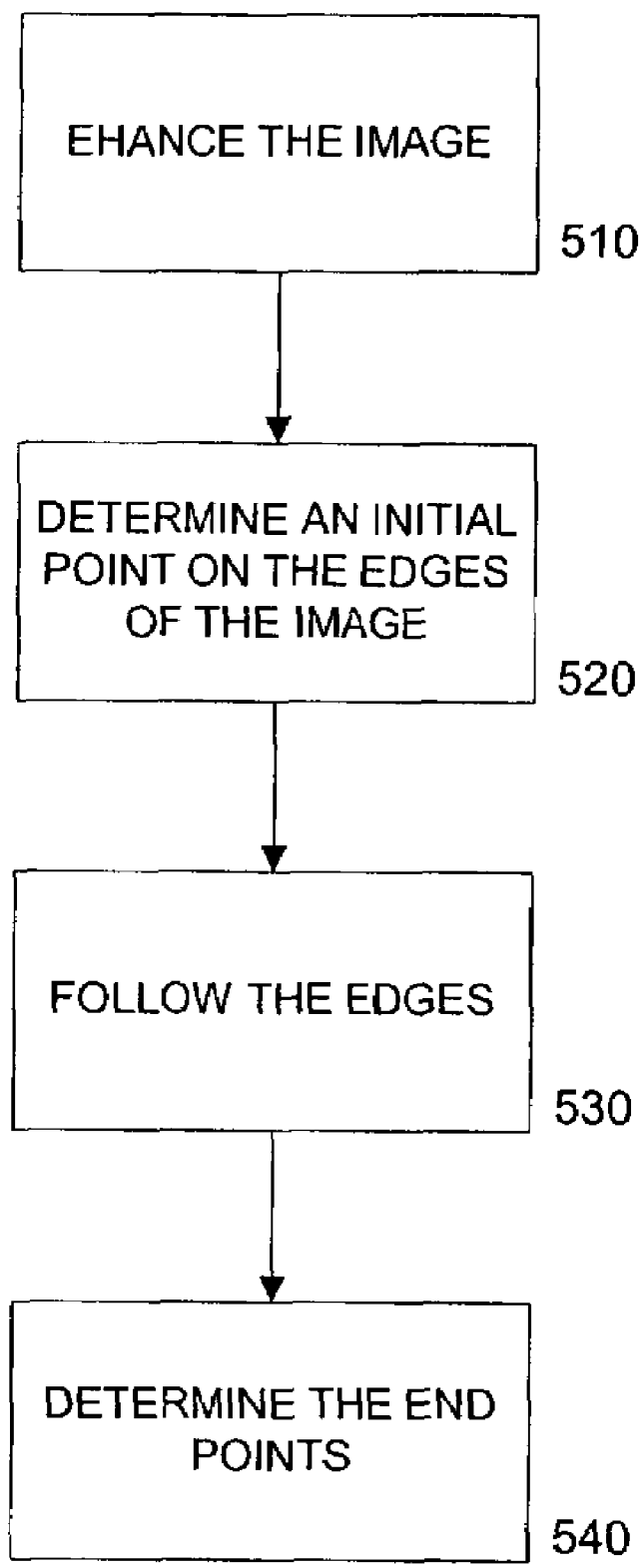
FIG. 5 illustrates a method of finding the points of interest in an image.

FIG. 5 describes an image-processing algorithm, under one embodiment of the invention. An algorithm such as described in FIG. 5 may be executed in order to determine the locations of the end points of the light source in the image. In step 510, the image is preprocessed to enhance the light source in the image. In one embodiment, a horizontal second order edge derivative can be calculated. In other embodiments, other edge and intensity filters can be used to enhance the image such that the projected image is more visible. In another embodiment, a method called 'background subtraction' is applied, where the light source is turned on and off and two images are grabbed. The difference of these images contains the light source. An example of an enhanced image is illustrated in FIG. 4B.

In step 520, a starting initial point is determined on the edges of the image. Without any limitation, the starting point can be determined randomly, or on a specific column of the image, or as the intersection of lines when multiple lines exist in the projection pattern.

In step 530, the edges are followed using an edge following algorithm starting from the initial point determined in step 520. Examples of edge following (linking) algorithms can be found in "Digital Image Processing", by Rafael C. Gonzales, and Richard E. Woods, published by Addison-Wesley, 1993.

Step 540 determines the two end points (see numerals 440 and 450 in FIG. 4C) of the line. These points can be described as the points where the edge following in step 530 stops due to the end of the edges.

Once the two end points are determined in step 540, the geometrical processing is applied. One technique for applying geometrical processing is described in FIG. 6. A method such as described in FIG. 6 may be executed in order to find the real length of the line using the image (r,c) locations of each end point. Step 610 maps the image (r,c) locations of each end point to (X,Y,Z) location in real world. This task can be accomplished by a technique commonly called triangulation in the art (also described in Machine Vision by R. Jain, R. Kasturi, B. G. Schunck, published by Mcgraw Hill Interational Editions, 1995.). Step 620 determines the length of the line using the (X,Y,Z) locations of the end points.

Figure 7:
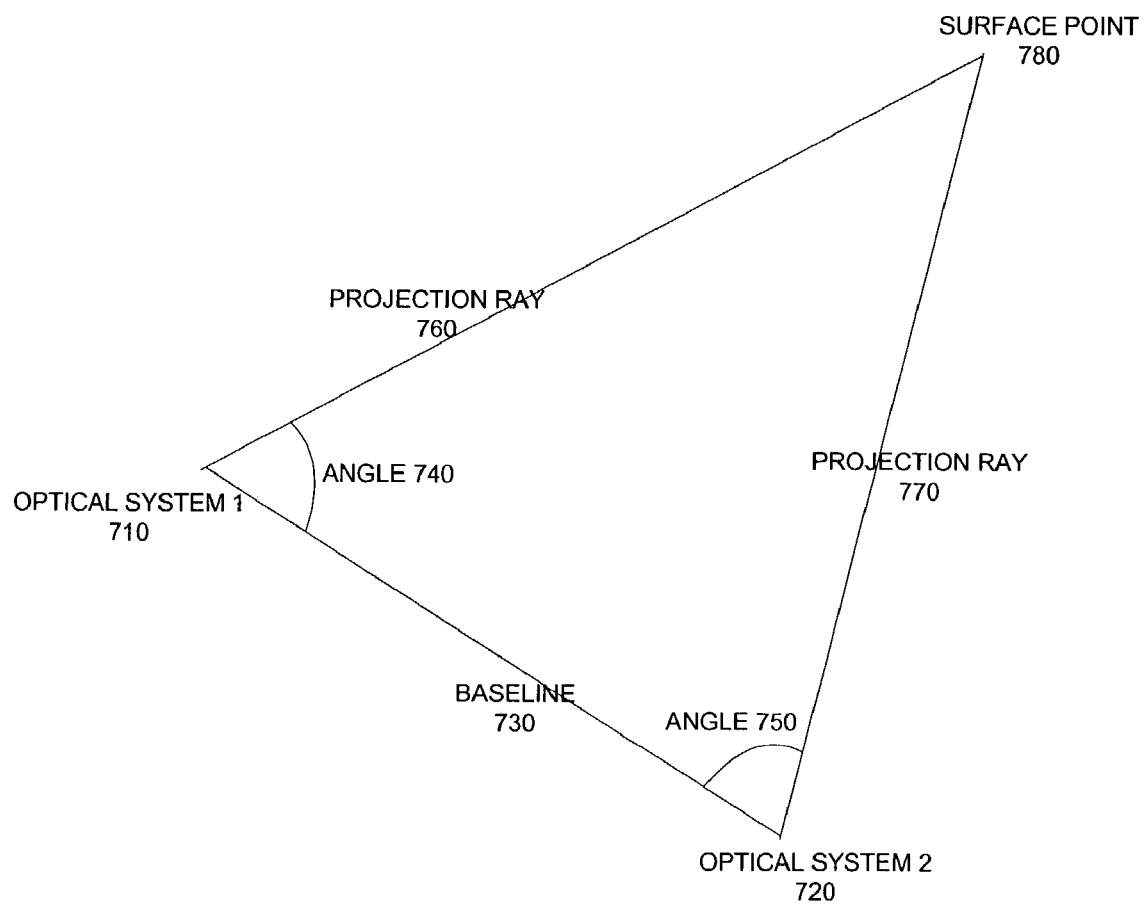
FIG. 7 illustrates the components of a triangulation system.

Triangulation systems in computer vision determine the shape of surfaces in the world by analyzing triangles formed by the projection rays of two optical systems. The basic geometry is shown in FIG. 7. The baseline 730, that is, the length of the line that connects the centers of a first optical system 710, and of a second optical system 720, is known. Given a point 780 on a visible surface in the world, the first optical systems 710 and the second optical system 720 determine the elevation of the triangle above a reference plane, as well as the angles 740 and 750 formed by the projection rays 760 and 770 that connect the surface point 780 with the centers of projection of the two optical systems. Together with the baseline 730, the two angles 740 and 750 determine the shape of the triangle completely, and simple trigonometry yields the distance to the surface point 780, or (X,Y,Z) coordinates of the point in the real world.

Figure 6:
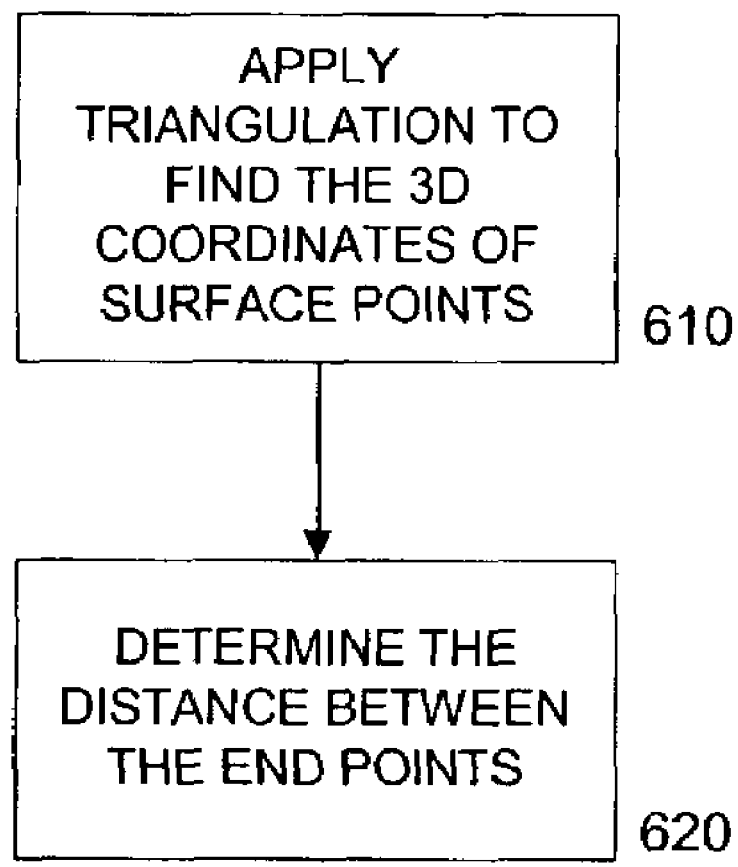
FIG. 6 illustrates steps of geometrical processing for an optical measurement device.

In the optical measurement device described here, second optical system 720 is a standard digital or analog camera with a planar sensor. The nature of first optical system 710 is a structured light system. The (X,Y,Z) location of any point can be calculated by resolving the correspondence between the structured light source and the camera image. When the end points are determined (such as described in step 540 of FIG. 5), the (X,Y,Z) physical coordinates of the end points are also determined using triangulation. With reference to FIG. 6, step 620 may be performed by determining the real physical length between the end points using the Euclidean distance between the coordinates of the two end points.

Figure 8A:
FIGS. 8A and 8B illustrate objects that can be used with embodiments of the invention.
Figure 8B:

FIGS. 8A-8B demonstrate various objects that can be measured using different operational modes of an optical ruler. The optical ruler has many extensions and capabilities compared to a regular, mechanical ruler. One embodiment provides that there are three main measurement modes of operation: end point mode, perimeter mode and multiple face mode.

FIG. 8A and FIG. 8B may be used to demonstrate the end point mode. Once the end points of an object are determined (see 620 of FIG. 6), the three-dimensional (direct) distance between the end points are provided to the user. For instance, this mode gives the diameter of a circular object 810. This mode also gives the length of the front face of the box 820 in FIG. 8B.

The perimeter mode takes all the points in the trajectory of edge following algorithm into account. It calculates the total traversed distance by summing all finite distances between consecutive points. This mode gives the perimeter of the circular object 810 in FIG. 8A. This mode is useful for cases where the measured object is curvy.

Multiple faces mode is related to measuring multiple faces of a box with one snapshot. This mode of operation is related to a sensitivity measure used in edge following. In regular operation of the ruler, the sensitivity measure is high, the edge following breaks when edge direction changes. For example, only the edge in the front face of the box 820 in FIG. 8B is measured in the end points mode. In the multiple faces mode, the sensitivity measure is low, and the edge is followed even if the edge direction changes. As a consequence, two faces of a box 820 are measured as shown in FIG. 8B. The user can adjust this sensitivity measure according to his purpose.

In another embodiment, the mode of an optical ruler can also be determined according to the object's shape. For example, the ruler would have a drop down menu, or a physical switch that contains selections of various objects, such as circle (sphere), triangle, rectangle, etc. The ruler gives shape specific information such as edge length, area, volume, etc according to the user selection.

E. Description of the Optical Volume Measurement Device

In several situations it may be useful to measure either the dimensions or the volume of a box, or perhaps the area of some of its faces. These situations include the dispatch of parcels in a package distribution center, the measurement of items to be loaded onto a vehicle such as a delivery truck, or the control of the inventory in a warehouse. In these circumstances, boxes may be measured as they move on a conveyer belt past a measuring device, or perhaps as an operator points a handheld version of such a device towards each of the boxes of interest. The desired measurements may appear on a display on the measurement device itself, or may be transferred to a computer for a variety of purposes (inventory, statistics, quality control, et cetera).

Figure 9:
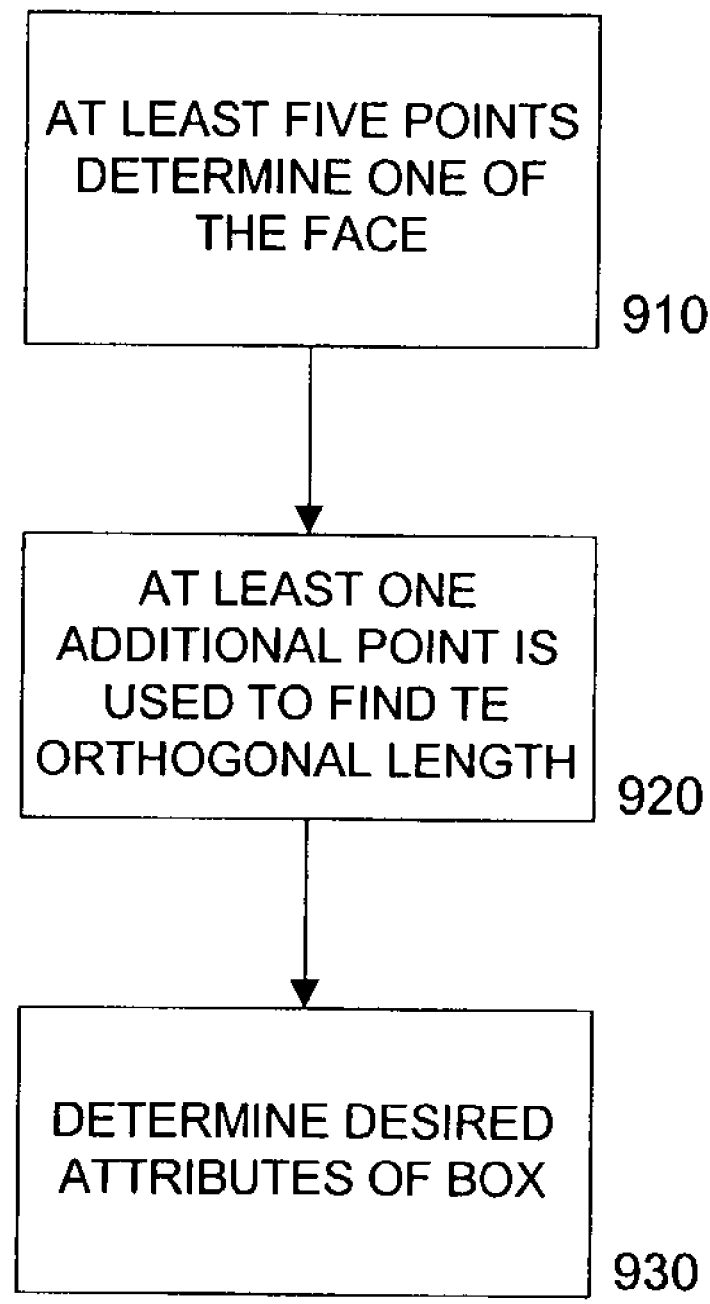
FIG. 9 illustrates the minimal conditions on the light pattern to measure the volume or area of a box.

The ideas involved in the optical measurement device can be extended to perform such tasks on a box. FIG. 9 illustrates an embodiment where optical measurements such as described may be used to measure attributes of a box. In one application such as described in FIG. 2, a suitable grid of lines of light is projected onto the box from a handheld or stationary device. A camera attached to the same device observes the projection of the lines onto the box. There are two minimal conditions described with FIG. 9.

Step 910 states that at least five, but possibly more, of the points are necessary for the calculation that determines the four segments in space that delimit one face of the box.

In step 920, at least one additional point, but possibly more, is used to determine the size of the box in the direction orthogonal to the face measured in the first calculation.

Step 930 provides that the desired geometrical attributes of the box are determined using the points calculated in the above steps. In one embodiment, step 930 calculates the dimensions of the box. Specifically, the results from the step 920 can then be converted into the three dimensions of the box, and optionally into its volume. Using a family of projection patterns, the volume measurement can be done in one shot.

Figure 10:
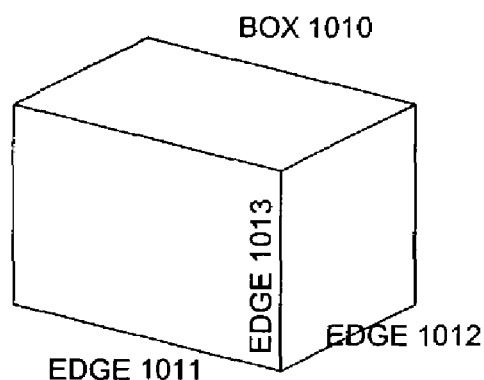
FIG. 10A illustrates a box for use with an embodiment of the invention.
FIG. 10B illustrates a light pattern for optical volume measurement device in an embodiment of the current invention.
FIG. 10C illustrates the light pattern in FIG. 10B projected on the box in FIG. 10A.
Figure 10:
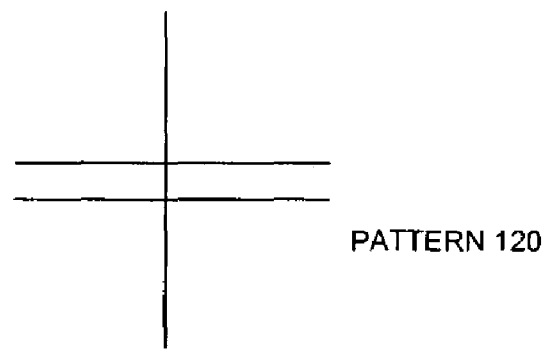
Figure 10:
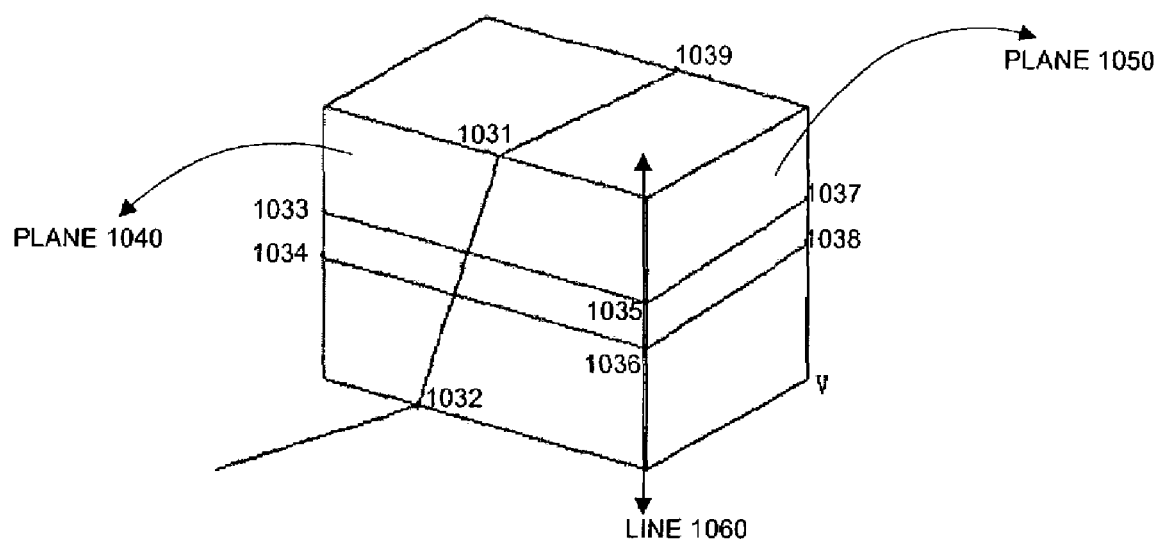

For the purpose of many applications described herein, a box may be assumed to be any object in the shape of a right parallelepiped, that is, a 6-faced polyhedron all of whose faces are rectangles. FIGS. 10A-10C illustrate how an embodiment of the invention may be implemented on a box. Because all faces are rectangles, two faces that are mutually adjacent form a right angle, and opposing faces are mutually parallel. In FIG. 10A, a box 1010 is shown. The dimensions of box 1010 that are used include the three lengths 1011, 1012, and 1013. Each of these three lengths corresponds to distances between pairs of opposing faces. The volume of the box 1010 is the product of its dimensions.

In an embodiment, a projector projects a pattern of light onto the box 1010 to measure its dimensions. In another embodiment, the lines are already drawn on the box and there is no need for projection. In either case, at least two lines are needed. In order to explain the principle of operation in a concrete way, without any limitation, the case in which a three-line pattern 1020 is illustrated in FIG. 10B.

FIG. 10C further illustrates the case where the three line pattern 1020 is projected onto the box in 1010 in such a way that the intersections of the lines fall somewhere on the front face of the box. Then, the three lines intersect at the boundary of the front face of the box at six points, denoted by the points 1031 through 1036 as shown in the box 1010. The line through 1032 and 1031 also continue along the top of the box, and encounter its back edge at point 1039. Similarly, the two lines through 1033 and 1034 continue on the right side of the box, and meet its back edge at points 1037 and 1038.

In an embodiment, the camera can be designed so as to be maximally sensitive to the light that forms the lines, and minimally sensitive to ambient light. Then, the image from the camera contains essentially only the polygonal lines formed by the intersections of the lines of light with the box. The image can further be preprocessed using edge detection, or background subtraction (as described in 510) and an enhanced image can be obtained.

The nine key points 1031 through 1039 in 1030 can all be found in the image either as points where the lines suddenly change direction (points 1031, 1032, 1035 and 1036), or as points where the lines terminate (points 1033, 1034, 1037, 1038, 1039).

In one embodiment, it is sufficient to start from the intersection of the three lines (see for example step 520 of FIG. 5), a feature easily identifiable in the image, and then follow the edges in the direction of the six outward rays until they terminate (see step 530 in FIG. 5). In the process, the positions of points where the lines change direction or terminate are recorded (in, for example, step 540 of FIG. 5). Using this procedure, all of the nine points (or the ones that are visible in the image) are identified.

Figure 11:
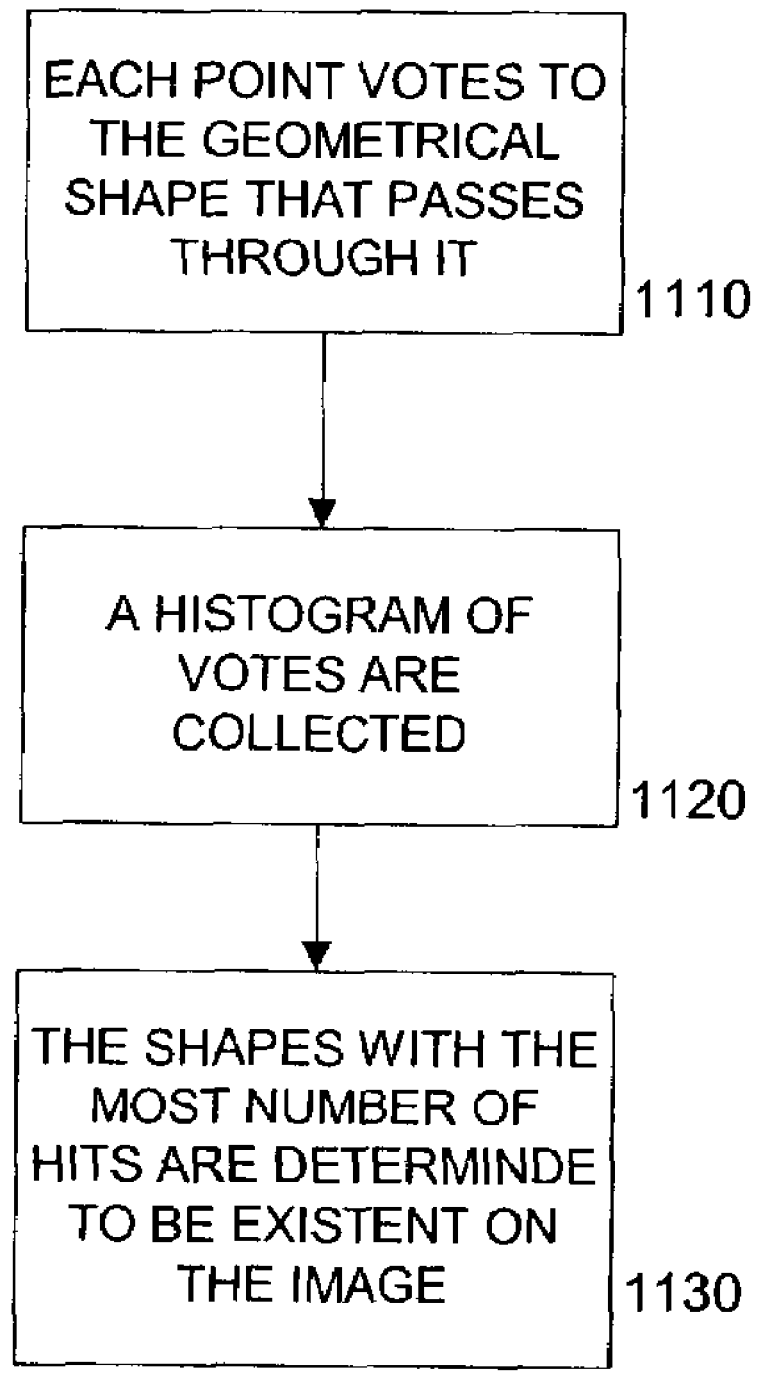
FIG. 11 illustrates a method of image processing in an embodiment of the optical volume measurement device.

In another embodiment, a method called Hough Transformation as described in FIG. 11 to detect the lines in the image, under an embodiment of the invention. Hough Transformation is a well-known image processing technique to determine the existence of particular geometrical shapes, such as line, circle, etc. in an image. In step 1110, each pixel of an image votes towards the geometrical shapes that would pass through that pixel. In step 1120, a histogram of votes is calculated. The histogram may comprise bins where that define vote distribution. In step 1130, the shapes (or bins) that get the most votes are declared to be existent on the image. Without any limitation, the Hough Transform algorithm can be used to find the lines in an image.

In another embodiment, the Hough Transform method is modified for efficiency purposes, where each bright pixel votes for only one line that passes through it as opposed to voting for every possible line that pass through it.

Once the end points are identified, the geometrical processing is applied to find the real world lengths. In one embodiment, the three-dimensional coordinates of the points can be calculated by triangulation as described in 700. Once the triangulation step determines the three-dimensional coordinates of the edge and intersection points 1031 through 1039, the real lengths of the edges of the box are calculated. There are many methods to find these lengths.

Figure 12:
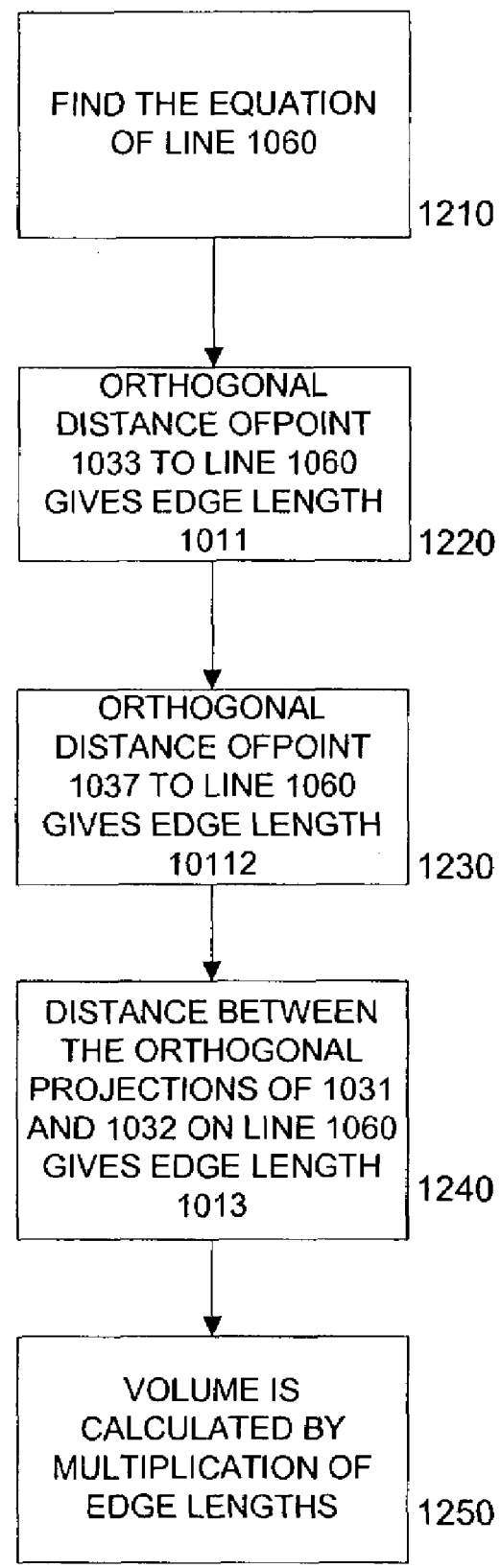
FIG. 12 illustrates a method of geometrical processing in an embodiment of the optical volume measurement device.

One embodiment is described in FIG. 12. Reference to numerals of FIGS. 10A-10C are provided for illustrative purposes. In step 1210, the algorithm finds the equation of the line that passes through one of the pairs of points that intersect the same edge of the box. For purpose of example, these points may correspond to points 1035 and 1036 in FIGS. 10A-C. With further reference to FIGS. 10A-10C, there are various methods for finding the line 1060 equation that passes through 1035 and 1036. In one embodiment, the coordinates of the points 1035 and 1036 can be used to determine the line 1060. This method, however, is sensitive to the calculation of these points in the earlier image processing and triangulation stages. In another embodiment, the system applies linear least square fitting to determine the equations of the two planes, plane 1040 identified by the points 1031 through 1036, and plane 1050 identified by the points 1035 through 1038. Next, the algorithm identifies the intersection of the two planes, which is the line 1060.

In step 1220, the first box length 1011 is given by the orthogonal distance of point 1033 (or 1034) to line 1060.

In step 1230, the second edge length 1012 is the orthogonal distance of point 1037 (or 1038) to line passing through 1060.

In step 1240, the third edge length 1013 is the distance between the orthogonal projections of points 1031 and 1032 on line 1060.

In step 1250, the volume of the box is calculated by the multiplication of the three edge lengths 1011, 1012, and 1013.

Figure 13:
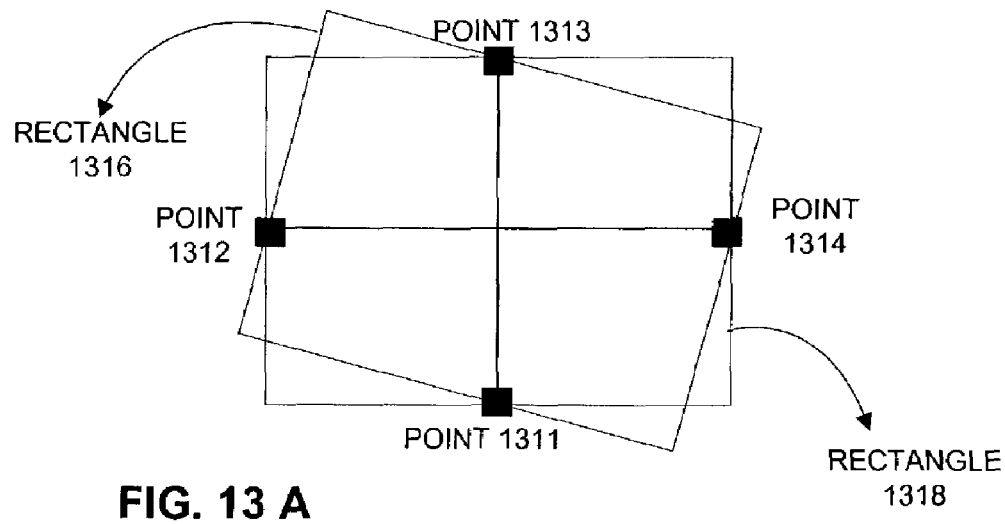
FIGS. 13A and 13B illustrate the total number of points necessary to identify a rectangle.
Figure 13:
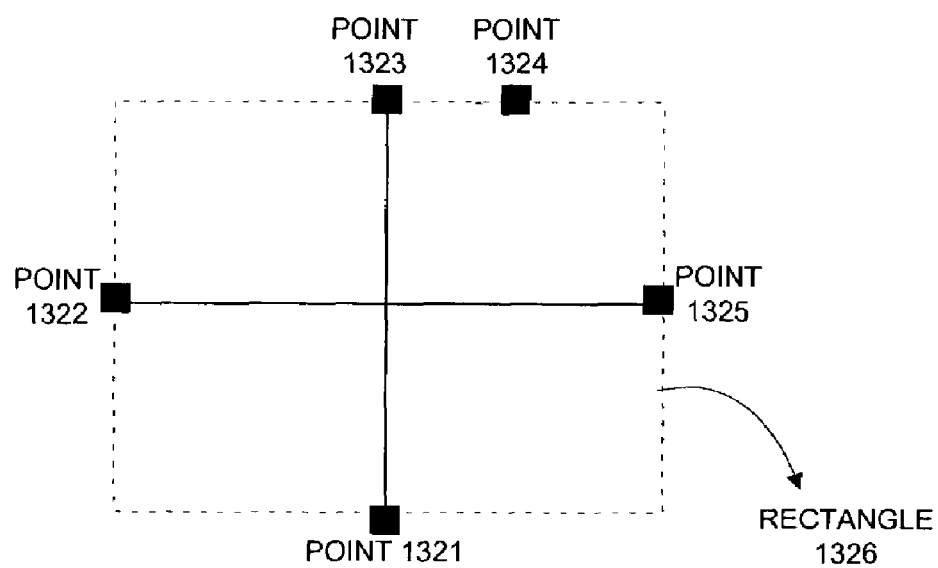

The three lines in 1020 form a pattern that is easy to generate and process, but they are not the only possibility. FIG. 13A shows one alternative possibility. First, it should be obvious that four points are not sufficient to represent a rectangle. For instance, FIG. 13A shows two rectangles 1316 and 1318 with different dimensions that go through four points 1311, 1312, 1313 and 1314. This demonstrates that it is not possible to determine a rectangle from just four points on its edges. In addition, if the line pattern is projected from an angle, the two projected lines are not necessarily orthogonal, thereby increasing ambiguity even further. FIG. 13B shows that where there are five points, 1321 through 1325, there exists only one rectangle 1326 that passes through them.

Figure 14:
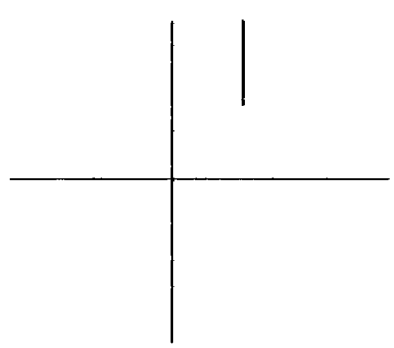
FIGS. 14A-14E illustrate examples of projection patterns to be used in various embodiments of the optical volume measurement device.
Figure 14:
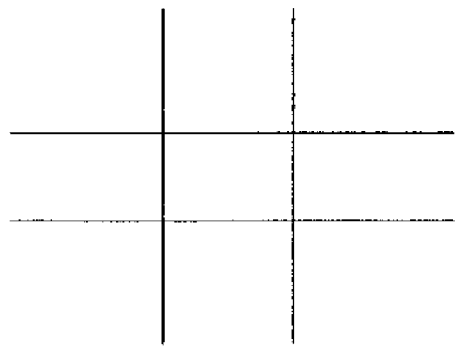
Figure 14:
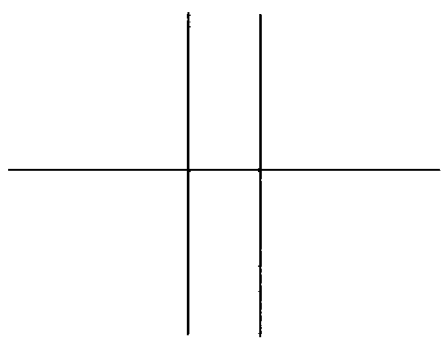
Figure 14:
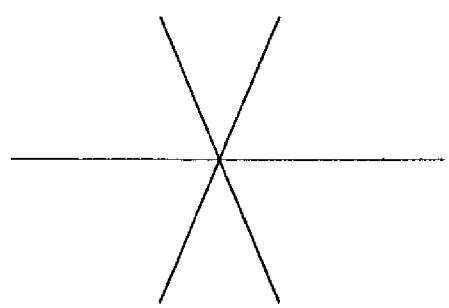
Figure 14:
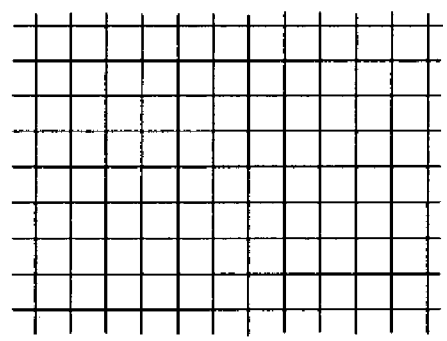

FIGS. 14A-14E show examples of possible light patterns for measuring the volume or area of a box. A minimal light pattern configuration would have a crosshair and an additional segment, as shown in FIG. 14A where the short segment provides the required fifth point. The three variations in FIG. 14B, FIG. 14C, and FIG. 14D produce six points, and are therefore redundant. In general, redundancy is beneficial: Since the methods to find the edge lengths determine edges by least-squares minimization, additional points reduce the effects of noise or other measurement errors. This suggests variations in the opposite direction, where entire grids of lines are projected, as in FIG. 14E. While more expensive, this solution produces more accurate results.

Figure 15:
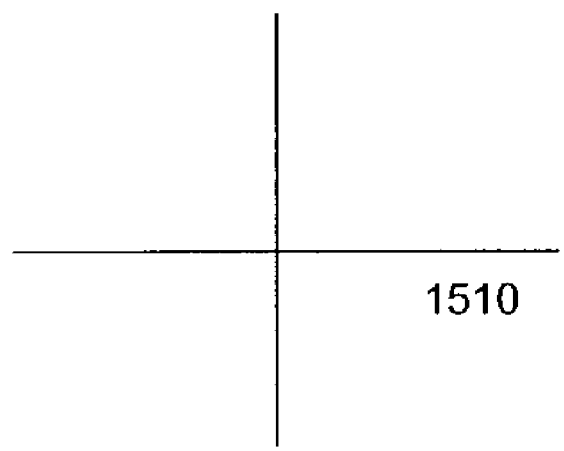
FIGS. 15A and 15B illustrate the use of a pair of lines in an embodiment of the optical volume measurement device.
Figure 15:
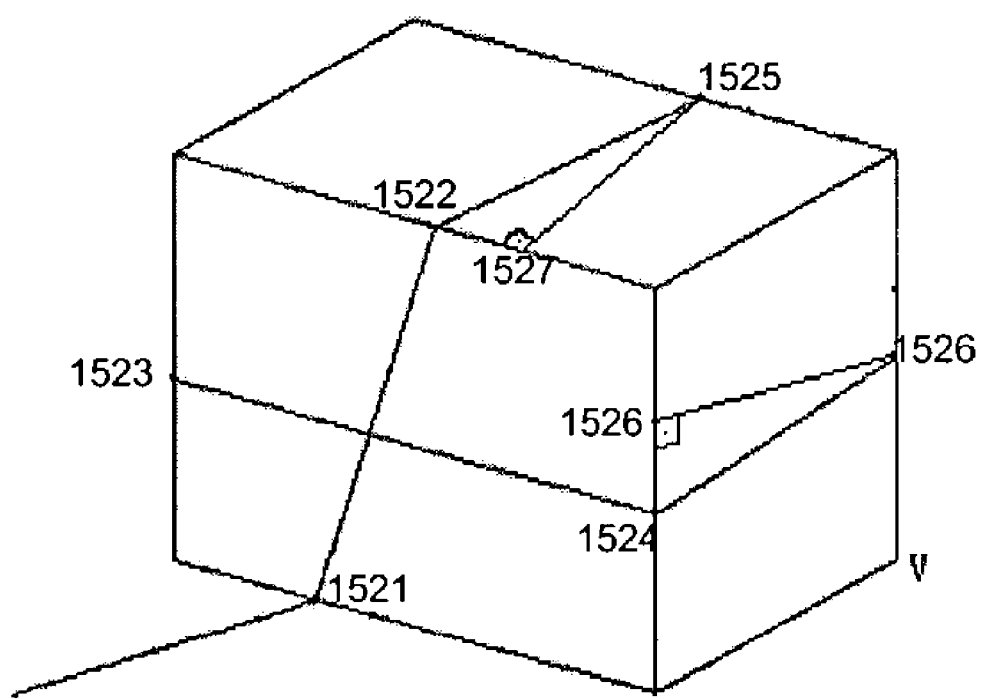

The minimal conditions described with FIG. 9 can be met using a pair of lines as well. The angle between the lines can be anything except for zero. FIG. 15A illustrates a case where the angle between the lines in 1510 is 90 degrees. In FIG. 15B, it is assumed that the intersection of the two lines falls onto the front face of the box as shown in 1520. The front face of the box intersects the projection lines at four points 1521, 1522, 1523 and 1524. The projection pattern also intersects the top face at point 1525, and the side face at point 1526. The fifth point that is necessary to define the rectangle in the front face can be given by the orthogonal projection of the point 1525 to the front face, which is the point 1527 or the orthogonal projection of the point 1526 to the front face, which is the point 1528. The only restriction is that the orthogonal projection provides a different projection point than the four existing intersections of the projection pattern with the front face. In other words, the lines of the projection pattern should not be completely parallel to the edges of the box. This restriction is easily met by setting the angle between the pair of lines in the projection pattern different from 90 degrees.

Figure 16:
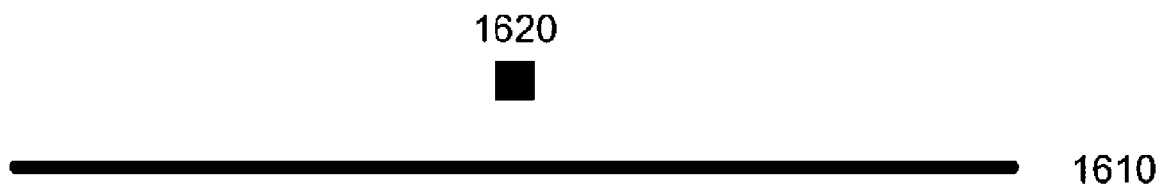
FIG. 16 illustrates a light pattern used in an embodiment of an optical measurement device to find the center of objects.

An optical measurement device can be used for finding the approximate center of a measured length. Without any limitation, FIG. 16 shows an example of a pattern that can be used for this purpose. The system projects a fan shaped light source 1610 and a point light source 1620 aligned around the center of the fan shaped light source. Although we illustrate a dot in this embodiment, any form of pattern to illustrate the center is possible. (e.g., a cross of lines can be projected, where the center is denoted by the intersection.)

Figure 17:
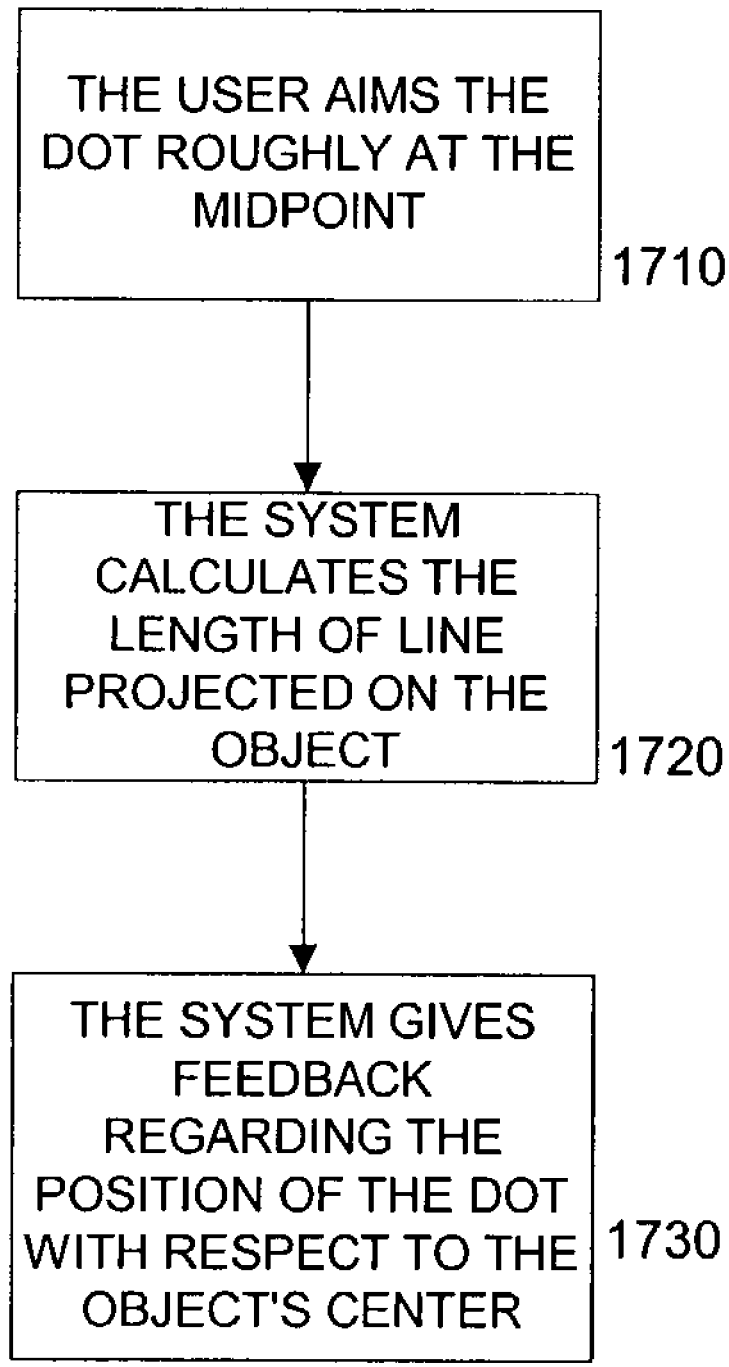
FIG. 17 illustrates a method used to find the center of objects in an embodiment of the invention.

In one embodiment, the steps provided in FIG. 17 are followed in order to find the approximate center of a measured length. In 1710, the user is asked to aim the point source (a dot) roughly at the mid-point of the object (s)he measuring. In 1720, geometrical processing is applied to find the length of the line 1610 as well as the three-dimensional location of the center dot 1620. When the three-dimensional location of the single dot is the same distance from the two end points of the line, the dot is in the center of the length that the user is measuring. In step 1730, the system gives a feedback by sounding a beep, or by giving some visual feedback to let the user know that the point source is aligned at the center, or to the left or right of the center.

Figure 18:
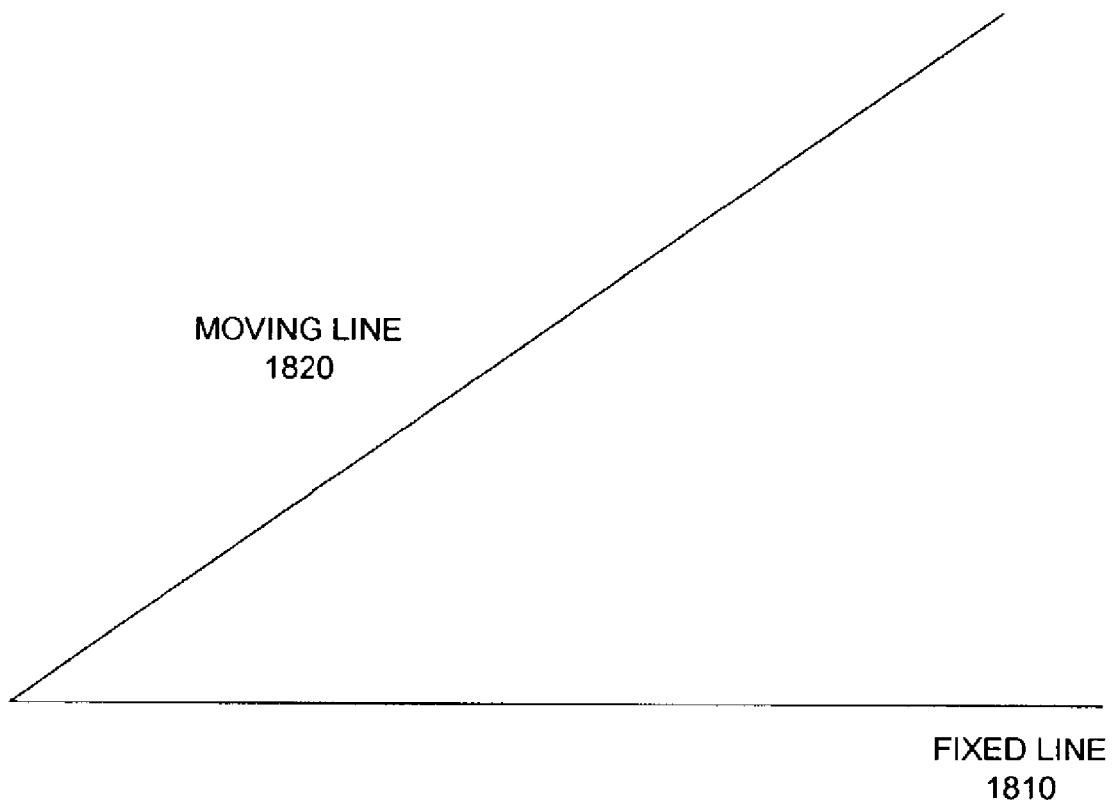
FIG. 18 illustrates a light pattern used in an embodiment of an optical measurement device to measure angles.

The system can be extended to angle measurement by the use of an adjustable light source as shown in FIG. 18. In one embodiment, the light pattern is composed of a fixed line 1810, and a moving line 1820. The user adjusts the moving line such that it aligns with the angle that he wants to measure. Next, image and geometrical processing techniques are used to find the corresponding end point locations on lines 1810 and 1820 respectively and measure the necessary angle.

The methodology can be extended using various patterns to measure various objects and parameters. A projected pattern that is composed of a pair of lines can be used to measure the diameter, area, and circumference of a circle. The obvious method is to find the intersection of bisectors of the two lines to find the center of the circle. Then, the radius r is determined yielding diameter, area, and circumference as $2*r$, $\pi*r^2$ and $2*\pi*r$, respectively.

These cases can be easily extended for determining perimeter, diameter, area, volume, center or radius of objects having any of the shapes like rectangle, circle, triangle, conic, spherical, and/or cylindrical.

F. Description of Hand Held Design Samples for Optical Ruler and Optical Volume Measurement Device The following section describes design scenarios for an optical ruler and an optical volume measurement system as a hand held device. The accuracy of a triangulation system would depend on the orthogonal distance between a camera (such as shown by element 110 in FIG. 1) and the light pattern q. In this document, we describe hand-held or portable devices for an optical ruler device that involves a one fan shaped light source, and a volume measurer that involves two or more fan angled lines.

Figure 19:
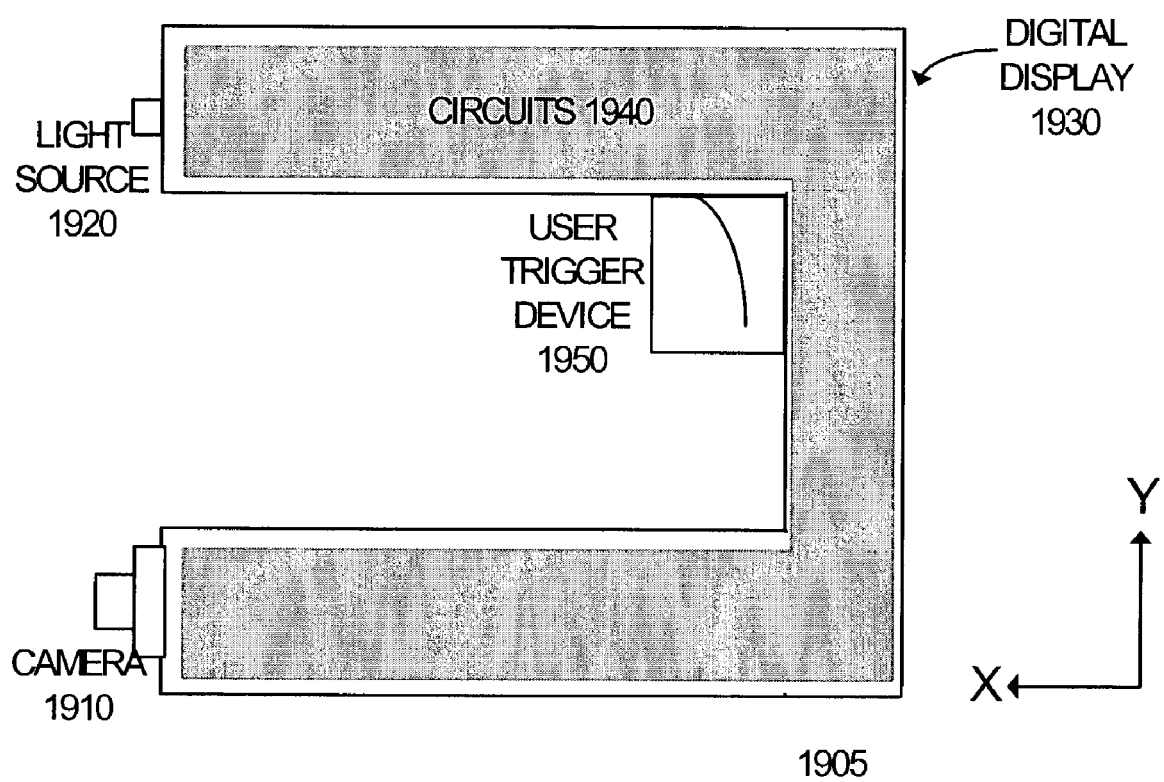
FIG. 19 illustrates a hand held device for optical ruler in an embodiment of the invention.

In one embodiment, the optical ruler contains a camera 110, a type of light source (e.g. a fan shaped)120, a processing unit 130, a communication interface 160, a user input device 150 and a display 140. The camera and the fan shaped light source need to have an orthogonal distance. Without any limitation, a gun like hand held device 1905 can be used as shown in FIG. 19.

A digital display 1930 is a useful but optional part of the device. The display 1930 may be mounted to the gun itself. It can be used for two purposes. One purpose would be to provide a digital read-out of the measurement to the person holding the gun. The alternative purpose is to show the scene and the image of the projected light. In this mode, the display can also be used to show the measurement of different segments of projected line. As the person aims the device on an object to be measured, and triggers it, the digital display 1930 shows the reading in some measurement unit. The circuits 1940 can contain the processing unit, circuitry and/or logic for communicating with other platforms. The processing unit can convert the distance to any desirable unit (e.g. inches, meters, etc.). In this design, the resolution of the system is determined by two metrics: (1) the distance of the object that is being measured and (2) the distance between the light source and the camera.

The inside of the gun could be used for the processing unit and any other necessary circuits. The device can also be interfaced to a computer using standard computer interfaces such as RS232, Universal Serial Bus (USB), parallel, etc. Other interfaces include a wireless interface such as Bluetooth, or IEEE 802.11a/b, etc. The measurement results are sent to the host through the interface. In one embodiment, the host device uses the same interface to send configuration commands to the device. In another embodiment, the raw images (frames) can be sent to the host device and the image processing to calculate the measurements can be done in the host device.

Figure 20:
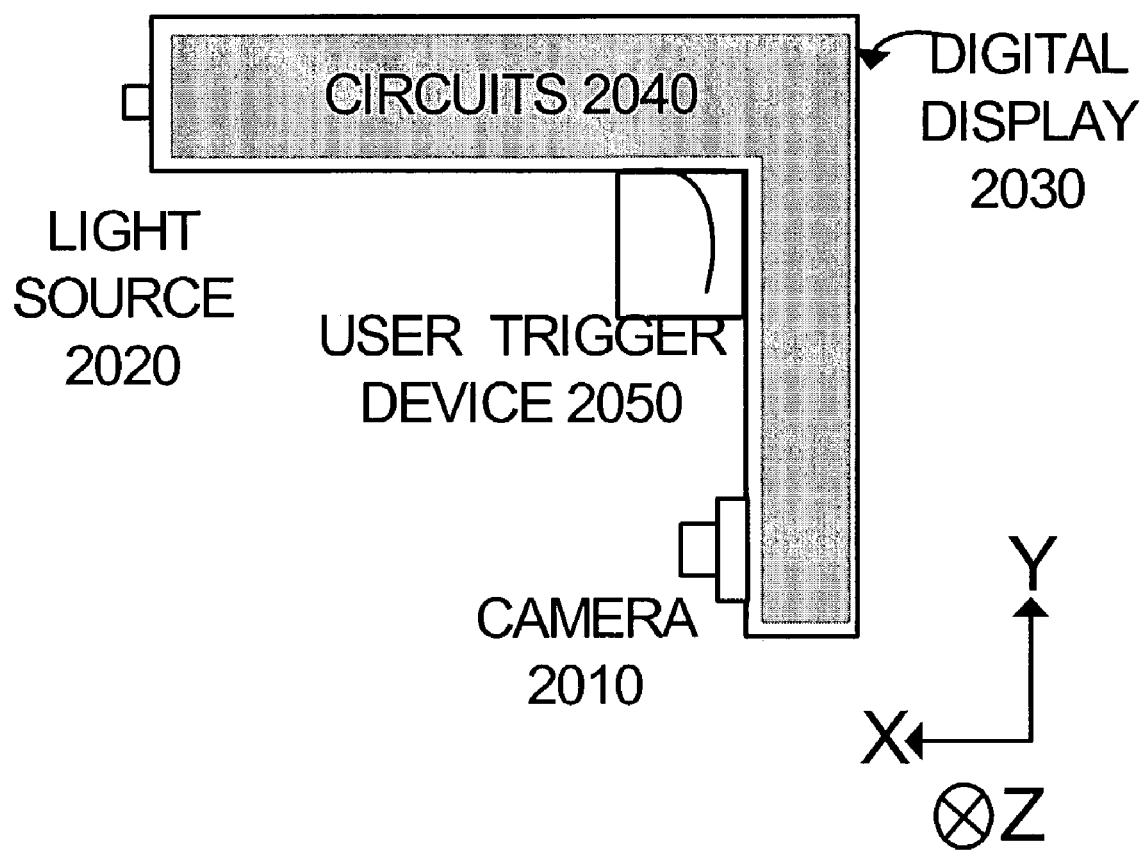
FIG. 20 is a side view of a hand held device for optical volume measurement device in an embodiment of the invention.
Figure 21:
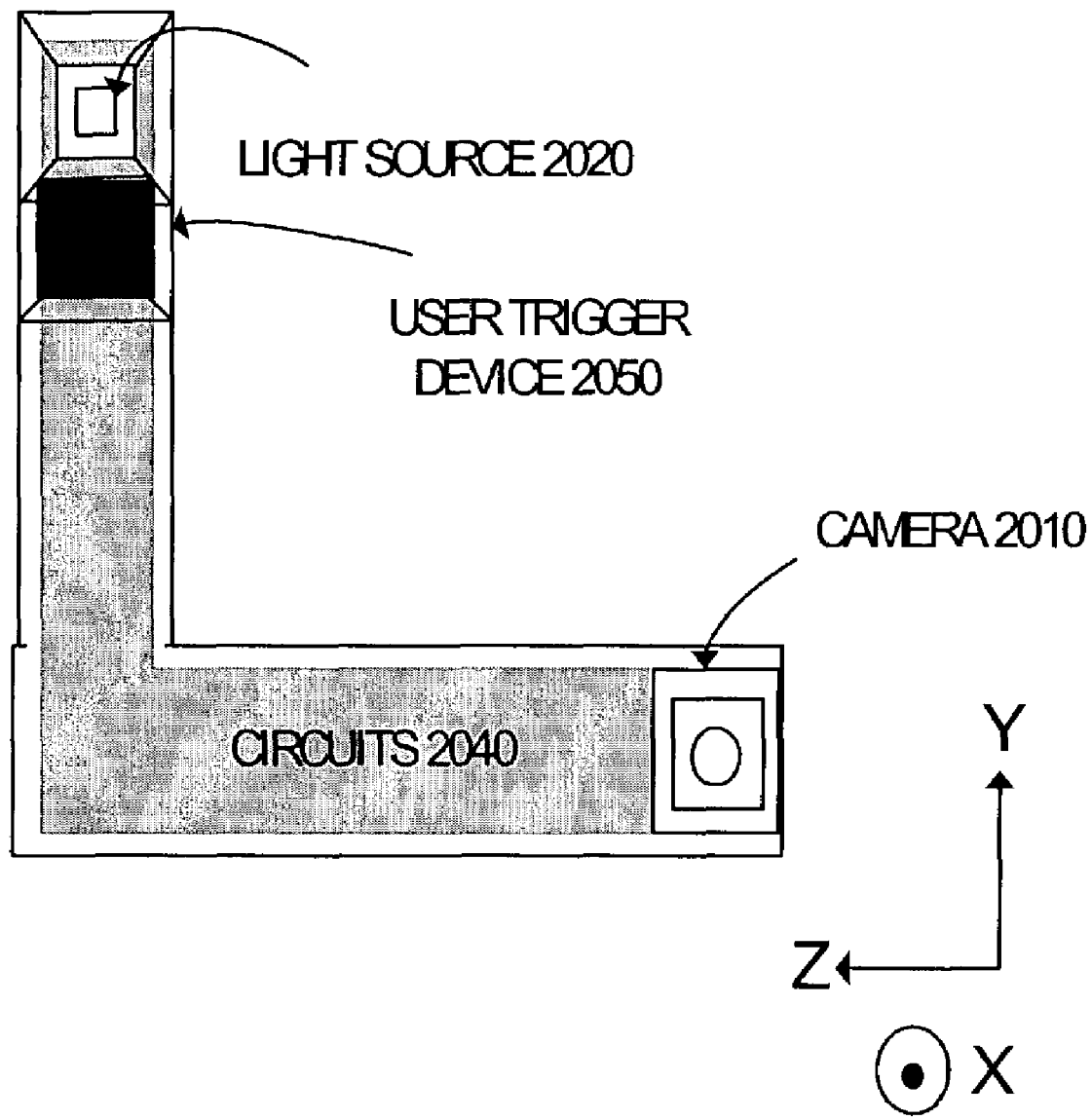
FIG. 21 is a front view of the hand held device in FIG. 20.

FIG. 20 is a side view a hand held device for measuring volume, under another embodiment of the invention. FIG. 21 is a front view of that device. At least two lines are necessary to measure the volume of a box. In this case, the camera needs to have an orthogonal distance to both of the lines. In the optical ruler case, the line was projected parallel to the X-axis, therefore, it is sufficient to locate the camera at a different location in the Y-axis. In the case of optical volume measurement device, some of the lines will be parallel to the X-axis, and at least one will be parallel to the Y-axis. In this case, the only way to obtain a camera location that is orthogonally distant to all of the light sources is through traveling in Z-axis. Therefore, the device can become more complicated than what is illustrated in FIG. 20 and FIG. 21.

G. A Volume Measurement Device without Pattern Projector

The volume measurement device can be designed without using a pattern projector as well. In this case, a pattern is drawn on the object to be measured. For instance, but without any limitation, the pattern to be drawn must include at least a pair of lines if the object is a box. In addition, the pattern must include a sub-pattern of known shape and size. This sub-pattern is used by the system to obtain the position and the orientation of the box with respect to the camera reference frame. This task is also called as finding the extrinsic parameters of a camera with respect to a reference frame. Here, without any limitation, we assume that the intrinsic parameters of the camera are known. The task of finding the extrinsic parameters can be accomplished using one of the existing camera calibration methods for finding the extrinsic parameters. Such methods are described in many vision books, and also in Machine Vision by R. Jain, R. Kasturi, B. G. Schunck, published by Mcgraw Hill Interational Editions, 1995.

Once the extrinsic parameters of the camera with respect to the object of interest is known, the length of each line on the object can be determined. Similarly, using the methods disclosed in this invention, the area, or volume of a box can be calculated.

H. Conclusion

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method to remotely measure the geometrical attributes of an object of known shape using reflected intensity from said object, the method comprising the following steps:
   (a) illuminating said object with a light source of known wavelength with an optical pattern of known pattern shape;
   (b) optically capturing in a single snapshot and without wavelength discrimination at said known wavelength an image using solely intensity data reflected by said object to observe a reflected pattern on said object from said light source, using a camera whose location and orientation are known with respect to said light source;
   (c) executing a first computer-implemented process to locate a plurality of key points in said image obtained by said camera; and
   (d) executing a second computer-implemented process to obtain a plurality of geometrical attributes of said object using said plurality of key points.

2. The method of claim 1, wherein step (d) includes obtaining geometrical attributes corresponding to at least one of a box, a cube, a rectangular parallelepiped, a circle, a sphere, and a cylindroid.

3. The method of claim 1, wherein step (d) includes determining a straight-line distance of two points identified as being on said image of said object.

4. The method of claim 1, wherein step (d) includes determining a surface-line distance of two points on said object.

5. The method of claim 1, wherein step (d) includes determining an angle of two lines on said object.

6. The method of claim 1, wherein step (d) includes determining a center of a line on said object.

7. The method of claim 1, wherein step (d) includes determining a mid-point of a line on said object.

8. The method of claim 1, wherein step (d) includes determining a center of said object.

9. The method of claim 1, wherein step (d) includes determining at least one of a width, a length and a depth of said object.

10. The method of claim 1, wherein step (d) includes determining a perimeter of said object.

11. The method of claim 1, wherein step (d) includes determining at least one of a surface area, volume, and weight of said object.

12. The method of claim 1, wherein step (b) includes illuminating at least one of a straight line, a straight line with tick marks, a plurality of parallel lines, a plurality of intersecting lines, a grid, and a plurality of known shapes.

13. The method of claim 1, further including enhancing said image of said reflected light pattern captured by said camera to more accurately locate said key points.

14. The method of claim 1, wherein step (c) includes executing instructions for performing a Hough Transformation.

15. The method of claim 1, wherein step (d) includes executing instructions for performing a triangulation to obtain a three dimensional coordinate of at least one of said plurality of key points.

16. The method of claim 1, wherein step (c) includes performing an edge following process to find locations of key points in said image.

17. The method of claim 1, wherein said object is a rectangular parallelepiped and said optical pattern intersects one face of said rectangular parallelepiped on at least five points and intersects a face orthogonal to said face on at least one additional point.

18. The method of claim 1, wherein said object is a rectangular parallelepiped and said optical pattern is a pair of lines.

19. The method of claim 1, wherein said object is a rectangle and said optical pattern intersects said rectangle on at least five points.

20. A system to remotely measure the geometrical attributes of an object of known shape, the system comprising:
   a processor;
   a memory storing at least one software module;
   a first optical system projecting an optical pattern of a known pattern shape and known wavelength on said object;
   a second optical system in a known position relative to said first optical system and having a field of view encompassing at least a reflected pattern from said object and responsive solely to intensity of reflections from said object to capture in a single snapshot and without wavelength discrimination at said known wavelength an image reflected by said object;
   wherein said at least one software module is executable by said processor to locate a plurality of key points in an image captured by said second optical system, and to calculate three dimensional world-coordinates of said points.

21. The system of claim 20, wherein said at least one software module is executable by said processor to locate said plurality of key points in said image using a Hough Transformation process.

22. The system of claim 20, wherein said at least one software module is executable by said processor to determine geometric measurements using said plurality of key points.

23. The system of claim 20, wherein said at least one software module is executable by said processor to transfer said image to a companion device having processing power and to use said processing power of said companion device to execute module instructions.

24. The system of claim 20, wherein said second optical system includes a camera sensor that detects a reflected portion of said optical pattern.

25. The system of claim 20, wherein said second optical system is substantially sensitive to optical energy of said optical wavelength.

26. The system of claim 20, wherein operation of said first optical system and said second optical system is substantially synchronous.

27. A method to remotely measure geometrical attributes of an object of known shape, the method comprising the following steps:
 a) drawing on said object, using a light source of known wavelength, a pattern of known pattern shape, and an additional pattern of known shape and size;
 b) using a camera to optically capture in a single snapshot without wavelength discrimination at said known wavelength an image using solely intensity of reflection to observe patterns on said object;
 c) applying image processing to locate a plurality of key points in said image obtained by the said camera; and
 d) applying geometrical processing to obtain a plurality of geometrical attributes of said object.

* * * * *